United States Patent Office 2,845,449
Patented July 29, 1958

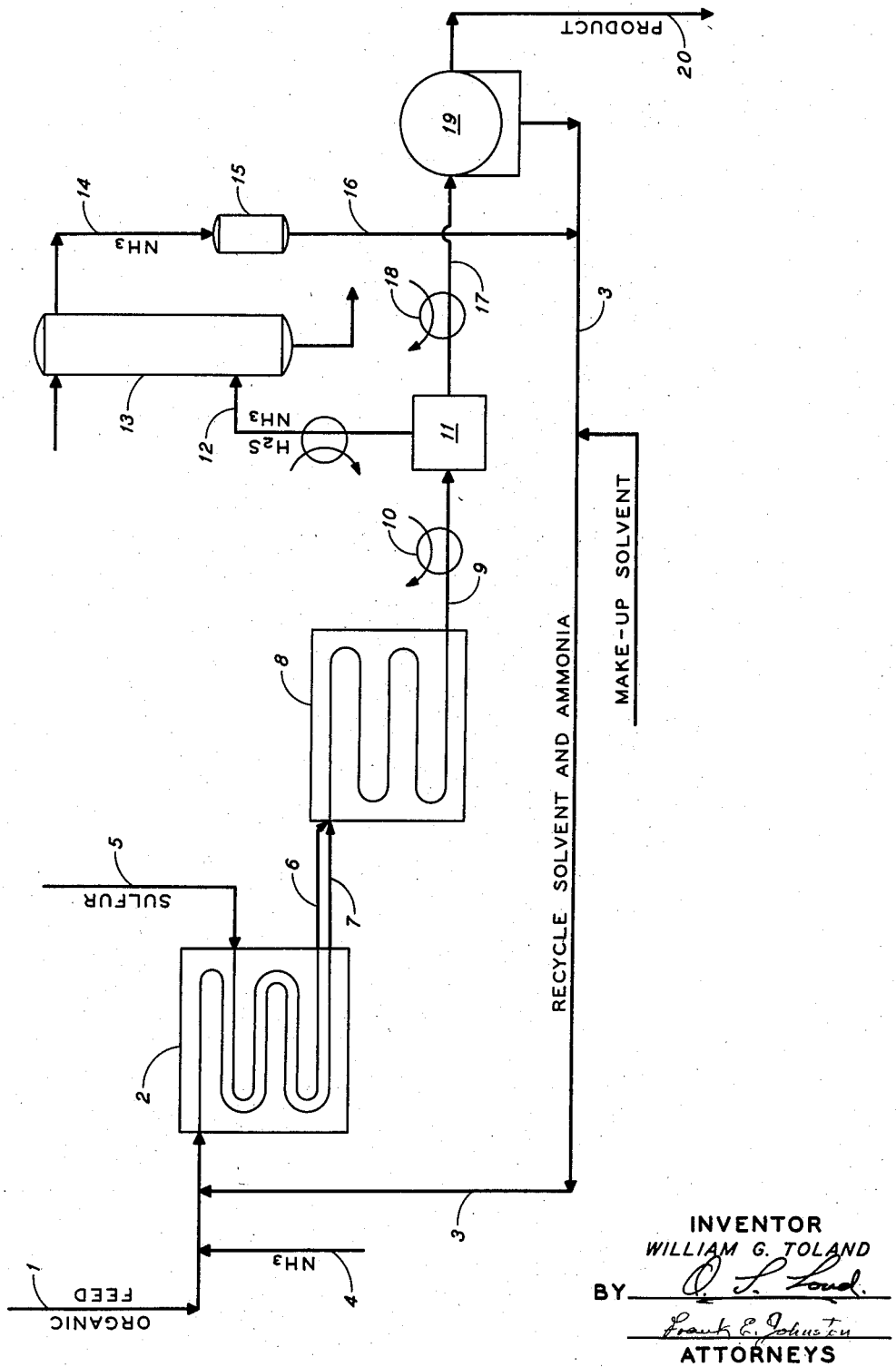

2,845,449

THIOAMIDE PRODUCTION

William G. Toland, San Rafael, Calif., assignor to California Research Corporation, San Francisco, Calif., a corporation of Delaware Application July 11, 1956, Serial No. 597,274

8 Claims. (Cl. 260—465)

This invention relates to an improved process for converting hydrocarbons and partially oxidized hydrocarbons to thioamides or nitriles.

It is known that hydrocarbons will react with elemental sulfur and anhydrous ammonia under elevated temperature and pressure to yield thioamides and hydrogen sulfide. U. S. Patent No. 2,610,980 discloses the fact that aromatic hydrocarbons having at least one hydrogen atom of the aromatic ring replaced by an alkyl group may be converted to thioamides by heating with sulfur and anhydrous ammonia at 180° to 340° C. U. S. Patent No. 2,744,134 discloses that aliphatic hydrocarbons may be similarly converted to thioamides. U. S. Patents Nos. 2,495,567 and 2,459,706 disclose production of thioamides by reaction of unsaturated hydrocarbons, mercaptans, alcohols, etc. with sulfur and anhydrous ammonia.

It has since been ascertained that not only hydrocarbons, but also partially oxidized hydrocarbons, especially those consisting entirely of carbon, hydrogen and oxygen, or of carbon, hydrogen and sulfur, may be similarly converted to thioamides by heating with elemental sulfur and anhydrous ammonia.

In my copending application Serial No. 356,097, now Patent No. 2,783,266 the fact is disclosed that if hydrocarbons or partially oxidized hydrocarbons are reacted with elemental sulfur and anhydrous ammonia at temperatures above about 400° F. and, if the produced hydrogen sulfide is bled from the reaction product while maintaining it at approximately reaction temperature, organic nitriles are produced instead of thioamides.

As these reactions have been conducted heretofore, yields of either thioamide or nitrile, based on hydrocarbon or partially oxidized hydrocarbon converted during the reaction, have been low, usually on the order of 25 to 50% of theory. These low yields appear to be attributable to large losses of hydrocarbon feed to undesired side reaction products consisting in good part of heavy tarry materials of undetermined composition.

It is an object of the present invention to conduct the reaction of hydrocarbons or partially oxidized hydrocarbons with anhydrous ammonia and elemental sulfur in such manner as to suppress losses of feed material to side reaction products and to obtain markedly higher yields of either thioamide or nitrile, as desired, than have heretofore been attainable.

Pursuant to the present invention, either a hydrocarbon or partially oxidized hydrocarbon feed is converted to a thioamide at high yields by heating the feed and ammonia to an elevated temperature above about 400° F., contacting the heated materials with elemental sulfur in a reaction zone, and maintaining the reaction zone at a temperature above 400° F., preferably under a superatmospheric pressure above about 200 p. s. i. g. The reaction product is cooled without releasing gases from the reaction zone to produce a thioamide product. If desired, gases may be bled from the reaction zone at approximately reaction temperature until the pressure is reduced to approximately atmospheric pressure. When this procedure is followed, the final organic reaction product is a nitrile rather than a thioamide.

The nature of the reaction is illustrated by the following equations:

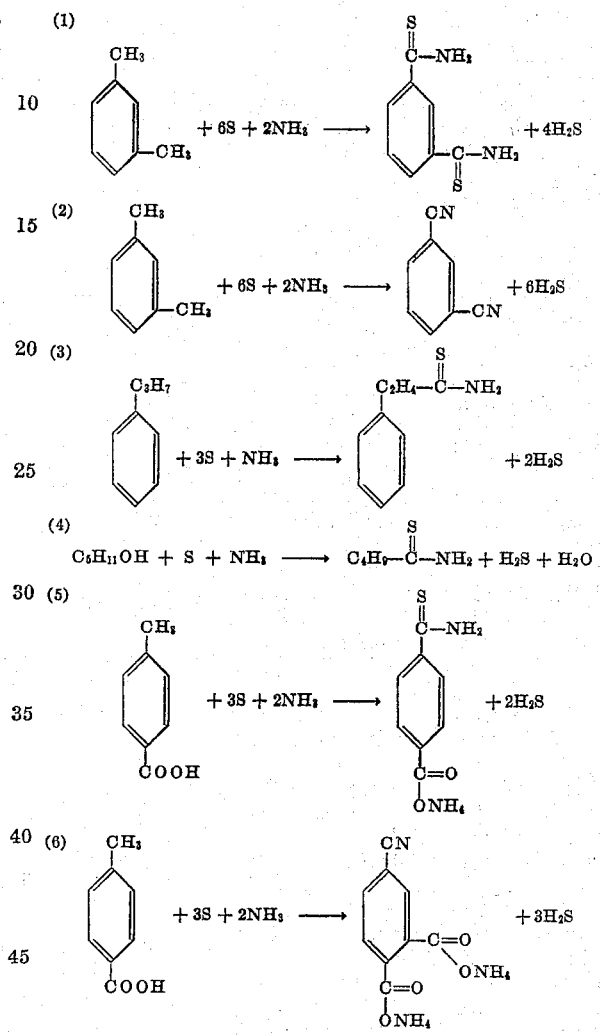

Equation 1 shows conversion of meta-xylene to thioamide; Equation 2 shows conversion of meta-xylene to isophthalonitrile; Equation 3 shows conversion of cumene to thioamide; Equation 4 shows conversion of aliphatic alcohol to thioamide; Equation 5 shows conversion of toluic acid to a half-salt-half-thioamide product; and Equation 6 shows conversion of toluic acid to an ammonium cyanobenzoate.

As indicated above, the question whether the final organic product is a nitrile or a thioamide is determined by the procedure followed upon completion of the oxidation reaction. If the reaction product is cooled without releasing gases from the reaction zone, the thioamide product is obtained, but if gases are bled from the reaction zone while the reaction mixture is maintained at approximately reaction temperature, i. e., above 400° F., then the nitrile product is obtained.

The process of the invention is conducted at temperatures above 400° F., for example, in the range 400° to 1000° F., and preferably in the range above 500° to 700° F. The organic feed and the ammonia are heated to a temperature above 400° F. and then contacted with elemental sulfur. The elemental sulfur may desirably be preheated to the temperature desired to be maintained in the reaction zone prior to bringing the hot feed and ammonia into contact with the sulfur.

While it is possible to conduct the reaction at atmospheric pressure, it is desirable to employ superatmospheric pressures above 200 p. s. i. g. and generally in the range 200 to 5000 p. s. i. g. to facilitate participation of ammonia in the reaction.

The time of the reaction will usually range from 10 minutes to about 2 hours. More desirably, the time of reaction will be from ½ to 1 hour at temperatures about 600° to 625° F. If the reaction is conducted at relatively lower temperatures, at or slightly above 400° F., longer contact times are required to obtain reasonably high conversions, while at higher temperatures, i. e., 700° F. or above, the reaction is ordinarily proceeded to a satisfactory degree in a relatively short time, ½ hour or less.

Approximately stoichiometric proportions of the reactants, i. e., the organic material, the sulfur, and the ammonia, as indicated by the appropriate equation similar to those shown above, may be employed in the process. However, it is desirable to employ ammonia in amounts substantially in excess of those stoichiometrically required for the reaction; for example, 2 to 50 times the stoichiometric requirement of ammonia may be advantageously employed. Excess ammonia is readily recovered from the reaction product and recycled to the reaction zone. It is also desirable, though not necessary, to employ quantities of sulfur substantially below the quantity stoichiometrically required for complete conversion of the organic feed; for example, the quantity of sulfur may be from 0.1 to 0.5 the amount required for complete conversion of the organic feed. When less than the stoichiometrically required amount of sulfur is employed, unconverted organic feed is recovered from the reaction product and recycled to the reaction zone. Instead of elemental sulfur, materials which yield elemental sulfur under reaction conditions may be employed in appropriate proportions, e. g., anhydrous ammonium polysulfide, mixtures of $H_2S$ and $SO_2$, mixtures of ammonium sulfite and $H_2S$, etc.

The reaction may be conducted in the presence of an inert diluent such as benzene, diphenyl, or the like. The diluent facilitates handling of reaction products which may be normally solid materials, and appears to assist in suppressing side reactions. 0.1 to 20 volumes of inert diluent per volume of organic feed are feasible quantities to employ in the reaction.

The improved method of the present invention, i. e., the prevention of any contact between the organic feed and elemental sulfur at temperatures below the reaction temperature, is effective to increase the yields obtained when organic compounds such as those shown in the patents referred to above are reacted with sulfur and anhydrous ammonia. Aliphatic hydrocarbons such as those shown in Patent 2,744,134, alkyl aromatic hydrocarbons such as those shown in Patent 2,610,980, unsaturated hydrocarbons such as those shown in Patent 2,495,567, and organic compounds of the character oxidized in Patent 2,459,706, may all be processed pursuant to the present invention to obtain substantially higher yields of thioamide or nitrile, if desired, than have been obtained heretofore. The method of the present invention is especially advantageous in oxidizing polyalkyl aromatic hydrocarbons, especially those having alkyl groups in ortho-relationship such as ortho-xylene, pseudocumene, hemimellitene, durene, isodurene, pentamethylbenzenes, and hexamethylbenzene, since high conversions to corresponding thioamides or nitriles may be obtained without the loss of an alkyl substituent or a partially oxidized alkyl substituent through decarboxylation. The thioamides or nitriles may be hydrolyzed to the corresponding carboxylic acids without appreciable decarboxylation.

The advantage of the method of the present invention may be illustrated by reacting meta-xylene with elemental sulfur and anhydrous ammonia at 600° to 625° F. and 2500 to 3500 p. s. i. g. for a period of approximately one hour. When the meta-xylene, sulfur and ammonia are initially mixed and heated together to reaction temperature in the manner heretofore employed and the reaction product is then depressured at approximately reaction temperature, the yield of nitrile based on meta-xylene converted is about 24%. When the reaction is conducted pursuant to the present invention by bringing the meta-xylene and ammonia separately to reaction temperature and then contacting these hot materials with hot elemental sulfur, and the reaction product is depressured at approximately reaction temperature, the yield of nitrile based on meta-xylene converted is 89% of theory.

The appended drawing is an illustration of apparatus and process flow suitable for the practice of the invention.

An organic feed, for example, xylene, is introduced through line 1 into a coil of furnace 2. Recycled solvent and ammonia are passed into line 1 through line 3 and makeup ammonia is passed into line 1 through line 4. Elemental sulfur is passed through line 5 into a separate coil of furnace 2. These materials pass through the respective coils of furnace 2 and are heated to reaction temperature, i. e., to 400° to 700° F. Hot sulfur leaves the furnace coil through line 6 and hot feed, ammonia and diluent leave the furnace coil through line 7. The hot sulfur in line 6 and a hot feed, ammonia and diluent in line 7 are passed into the coil of furnace 8. This coil constitutes the reaction zone. The reaction product mixture comprising nitrile, hydrogen sulfide, thioamide, ammonia and diluent is withdrawn from furnace 8 through line 9 and passed through heat exchanger 10 where the product is cooled to approximately a temperature below about 250° F. The reaction product is then passed into gas liquid separation zone 11. Hydrogen sulfide and ammonia are withdrawn from zone 11 through line 12 and passed through a hydrogen sulfide absorber 13. In the hydrogen sulfide absorber the ammonia and hydrogen sulfide may be contacted with a material which selectively absorbs hydrogen sulfide, for example, diethanolamine. The hydrogen sulfide may be recovered and oxidized to elemental sulfur for reuse in the process, if desired. Ammonia is withdrawn from absorber 13 through line 14, passed through a drier, for example, an alumina drier 15, where water vapor is removed from the ammonia. The dried ammonia passes from drier 15 through line 16 into line 3 through which it is recycled to line 1. The liquid phase comprising thioamide and diluent is withdrawn from separation zone 11, passed through line 17 and heat exchanger 18 to filter 19. Solid thioamide product is removed from filter 19 through line 20 and the filtrate comprising the diluent, i. e., benzene, is recycled from filter 19 through line 3 to line 1. If it is desired to produce nitrile instead of thioamide, the reaction product effluent from furnace 8 through line 9 is not cooled by heat exchanger 10 but, rather, is passed into gas liquid separation zone 11 at approximately reaction temperature. Ammonia and hydrogen sulfide are bled from the hot reaction mixture in zone 11 through line 12. When this procedure is followed, the liquid effluent from zone 11 is cooled to atmospheric temperature or lower, if required, by heat exchanger 18, and the product recovered at filter 19 is nitrile rather than thiomadie. Alternatively, the effluent from zone 11 may be distilled to recover nitrile product overhead; this procedure is desirable with soluble nitriles when a diluent is employed.

I claim:

1. In a process for reacting a compound selected from the group consisting of hydrocarbons and partially oxidized hydrocarbons with elemental sulfur and anhydrous ammonia, the improvement which comprises heating the organic compound and ammonia to a temperature above 400° F. in the absence of elemental sulfur and then intimately contacting the heated materials with elemental sulfur.

2. In a process for reacting a compound selected from the group consisting of hydrocarbons and partially oxidized hydrocarbons with elemental sulfur and anhydrous ammonia at an elevated temperature above about 400° F., the improved method which comprises heating the organic compound and ammonia to a temperature above 400° F. in the absence of elemental sulfur, intimately contacting the heated materials with each other and with hot elemental sulfur in a reaction zone, and bleeding gas comprising hydrogen sulfide from the reaction product at approximately reaction temperature.

3. In a process for reacting a compound selected from the group consisting of hydrocarbons and partially oxidized hydrocarbons with elemental sulfur and anhydrous ammonia, the improvement which comprises heating the organic compound to a temperature above 400° F. in the absence of elemental sulfur, heating the ammonia to a temperature above 400° F., and then intimately contacting the heated materials in a reaction zone with elemental sulfur to produce a reaction product.

4. In a process for reacting a compound selected from the group consisting of hydrocarbons and partially oxidized hydrocarbons with elemental sulfur and anhydrous ammonia, the improvement which comprises employing a stoichiometric excess of ammonia, bringing the reactants to reaction temperature of at least 400° F. without substantial contact between the elemental sulfur and the organic reactant, intimately contacting said elemental sulfur and organic reactant in a reaction zone at reaction temperature in the presence of the anhydrous ammonia, and disengaging the reaction promptly upon completion of the desired reaction product formation.

5. A process as in claim 3, with the additional step of depressuring said reaction product at approximately reaction temperature to produce a nitrile.

6. A process as in claim 3, with the additional step of cooling said reaction product without releasing gases from said reaction zone to produce a thioamide.

7. A process as in claim 4, with the additional step of depressurizing said reaction product at approximately reaction temperature to produce a nitrile.

8. A process as in claim 4, with the additional step of cooling said reaction product without releasing gases from said reaction zone to produce a thioamide.

References Cited in the file of this patent
UNITED STATES PATENTS

| | | |
|---|---|---|
| 2,459,706 | King | Jan. 18, 1949 |
| 2,495,567 | Carmack et al. | Jan. 24, 1950 |
| 2,610,980 | Naylor | Sept. 16, 1952 |
| 2,744,134 | Naylor | May 1, 1956 |

UNITED STATES PATENT OFFICE
Certificate of Correction

July 29, 1958

Patent No. 2,845,449

William G. Toland

It is hereby certified that error appears in the printed specification of the above numbered patent requiring correction and that the said Letters Patent should read as corrected below.

Column 2, lines 40 to 48 inclusive, right-hand portion of Equation 6 should read as shown below instead of as in the patent—

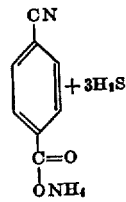

column 4, line 63, for "thiomadie" read —thioamide—.

Signed and sealed this 21st day of October 1958.

[SEAL]

Attest:
KARL H. AXLINE,
Attesting Officer.

ROBERT C. WATSON,
Commissioner of Patents.